Aug. 27, 1957 W. A. MOREY 2,804,493
APPARATUS FOR AUTOMATICALLY REGULATING ELECTRIC ARC FURNACES
Filed Oct. 10, 1955 2 Sheets-Sheet 1

INVENTOR
BY *Woodruff A. Morey*

United States Patent Office 2,804,493
Patented Aug. 27, 1957

2,804,493

APPARATUS FOR AUTOMATICALLY REGULATING ELECTRIC ARC FURNACES

Woodruff A. Morey, Homewood, Ill., assignor to Whiting Corporation, a corporation of Illinois Application October 10, 1955, Serial No. 539,389

8 Claims. (Cl. 13—13)

This invention pertains generally to direct arc electric melting furnaces, and more specifically to means for automatically regulating the arc current in such furnaces by varying the length of the arcing gap. This application is related to United States Letters Patent 2,653,269 and 2,671,181 dated September 22, 1953, and March 2, 1954, respectively, and is a continuation in part of application Serial No. 329,043, filed December 31, 1952, in the United States Patent Office and now abandoned.

One of the primary objects of this invention is the provision of means for automatically changing the length of arc in a direct arc electric furnace in such manner as to maintain the electrical energy flowing in the arc circuit substantially constant.

Another object of this invention is to reduce the inertia lag between generation of a signal and responsive movement of the electrode in direct arc electric furnace electrode control systems to a minimum.

An additional object of this invention is the provision of control apparatus for positioning the electrodes of a direct arc electric furnace, driven by a pair of unidirectional motors and operating to shift the position of the electrode automatically in such manner as to maintain the arc circuit substantially constant.

Additional objects, as well as many of the advantages of my invention, will be disclosed in the course of the following description and in the appended drawings in which.

In brief, my control requires the use of a member coupled to the electrode for transmitting movement thereto. This member, which is preferably a servo-motor, such as a piston, is in turn the output member of a hydraulic differential. Two input members, usually driven by motors, are employed to drive the differential, the output member of which responds only to differences in the effective speeds of the two oppositely driven input members. The effective speed of either or both of these members is varied automatically by control devices coupled to the arc circuit in such manner that the electrode is forced to move in the proper direction as required by variations in the condition of the arc circuit, and at speeds proportional to the deviation of the arc circuit condition from a selected normal.

Electric arc furnaces may utilize single phase, two phase, or three phase current, the latter being the most common. The control devices hereinafter described are adapted to control a single phase or electrode, three of the devices being required to control the three electrodes of a three phase furnace. For simplicity, only the mechanism required to control a single phase will be described, it being understood that similar additional devices are required for the remaining phases, if any.

Figure 1:
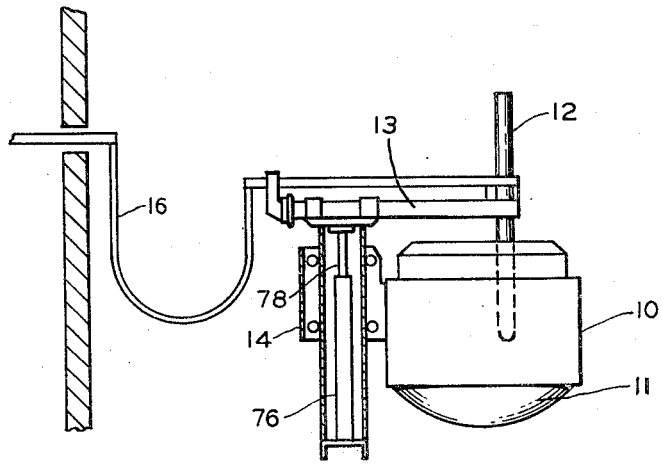
Figure 1 is a diagrammatic elevation of a direct arc electric furnace having means for varying the position of the electrode.

In Figure 1, I have illustrated a conventional electric furnace having a body 10 defining a hearth 11 and an open top into which an upright electrode 12 projects. A generally horizontal arm 13 supports the electrode and is in turn reciprocably supported by a mast 14 for vertical movement. Conductor means 16 connects the electrode 12 with a suitable source of electric power, such as a transformer.

Figure 2:
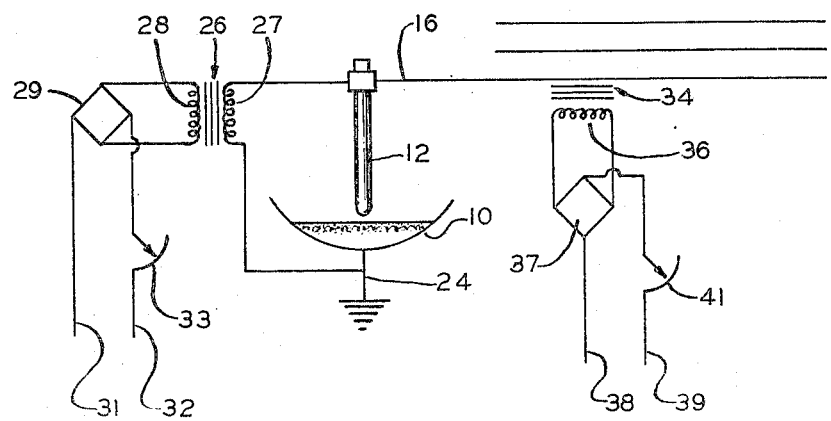
Figure 2 is a schematic circuit diagram of control apparatus suitable for use in my invention.

As illustrated in Figure 2, means are provided, indicated at 24, for grounding a conductive charge of metal disposed in the furnace body 10. A potential transformer, generally designated 26, has a primary winding 27 connected between the conductor 16 and ground. The secondary winding 28 of the transformer 26 energizes a rectifier 29, the output of which is connected to wires 31 and 32. A variable resistance 33 may be employed to regulate the output of rectifier 29.

I may also provide a current transformer, generally designated 34, coupled directly to the conductor 16 and having a secondary winding 36 connected to a rectifier 37. Wires 38 and 39 are connected to the rectifier output. A variable resistance 41 may be employed for regulating the output of rectifier 37. It will be understood that the means selected for regulating the output of the rectifiers 29 and 37 is largely a matter of choice and that auto-transformers may be inserted in the rectifier supply circuit to replace or supplement the variable resistances 33 and 41.

Figure 3:
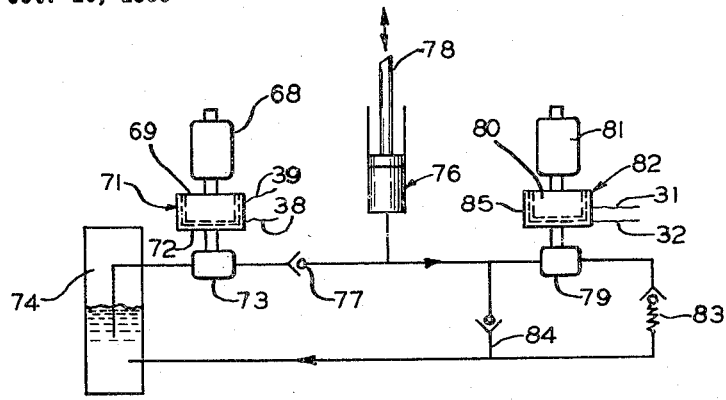
Figure 3 is a form of my invention utilizng alternating current motors coupled hydraulically to the electrode in such manner as to produce the desired regulating movement.

In Figure 3, I have illustrated a suitable hydraulic differential utilizng a rotary hydraulic positive displacement pump 73 and a similar pump 79, the latter preferably being twice the capacity of the pump 73. An alternating current motor 68 is coupled to an armature 69 of an eddy current clutch, generally designated 71. A field winding 72 of the clutch 71 is connected to wires 38 and 39 in such manner as to receive its power supply from the rectifier 37 and the transformer 34. A piston 76 communicates with the outlet of the pump 73 through a check valve 77 and is provided with a piston rod 78 coupled to the electrode arm 13 in such manner as to raise the arm 13 when fluid is introduced into the piston 76.

The outlet of the pump 73 also communicates through valve 77 with the inlet of pump 79 driven in a similar manner by an alternating current motor 81 and an eddy current clutch, generally designated 82. As previously described, the motor 81 is coupled directly to an armature 80 of eddy current clutch 82, the latter having a field winding 85 supplied with energy through wires 31 and 32 and connected to pump 79. The outlet of the pump 79 discharges through a spring loaded check valve 83 to an accumulator 74. A check valve 84 may be employed to interconnect the inlet of the pump 79 with the accumulator 74 and is adapted to supply fluid from accumulator 74 to pump 79 whenever the normal supply of fluid from pump 73 and piston 76 is for any reason inadequate. The inlet of pump 73 is supplied with hydraulic fluid from the accumulator 74 which is maintained at a pressure below the pressure produced on the piston 76 by the weight of the arm 13 and its associated moving parts.

From the foregoing, it will be apparent that when the piston 76 and therefore the arm 13 is motionless, the discharge volume of pump 73 must equal the discharge volume of pump 79. To move the arm 13 upwardly, thereby increasing the length of an arc formed between the electrode 12 and a charge in the furnace 10, it is necessary to either increase the discharge volume of pump 73 or decrease the discharge volume of pump 79. Since both pumps 73 and 79 are of the positive displacement type and are subjected to approximately constant inlet and outlet pressures, the desired changes in discharge volume are accomplished by a change in the speed of rotation of either or both pumps which is in turn attained by increasing or decreasing the slip of the eddy current couplings 71 and 82. Thus the speed of either pump should be understood as the effective speed of the corresponding motor. Downward movement of the arm 13 is of course accomplished by increasing the effective speed of motor 81 or by decreasing the effective speed of motor 68 or both.

When the furnace is in operation, an increase or decrease in the length of the arc formed between the electrode 12 and the charge in the furnace 10 causes a variation in the voltage applied to the primary winding 27 of transformer 26 which will of course produce a variation in the voltage applied to the field winding 85 of the eddy current clutch 82. If the arc lengthens beyond its desired setting, the resulting increase in voltage will permit the transmission of greater torque through the clutch 82 thus driving the pump 79 at a greater effective speed and thus causing the piston rod 78 and the electrode 12 to move downwardly toward the bath by leg withdrawing fluid from the piston. As the arc lengthens, the current flowing in the bus 16 if of course reduced which in turn reduces the output of the current transformer 34. This reduces the amount of torque which can be transmitted by the coupling 71 and thus supplements the action of the transformer 26 and the voltage 82. When the arc becomes shorter, the flow of current increases and the voltage available to the transformer 26 becomes less thus producing an effect the reverse of that described. During this regulating movement however, the motors 68 and 81 rotate at a substantially constant speed. It may be noted that the hydraulic system described is essentially one in which the pressure remains constant in the cylinder 76 and only the volume is varied by the relative speed of the input members of the hydraulic differential.

It is preferable that the valve 83, which opposes discharge from pump 79, develop sufficient pressure to prevent movement of liquid from the cylinder 76 to the accumulator 74 when the pump 79 is not operating.

Figure 4:
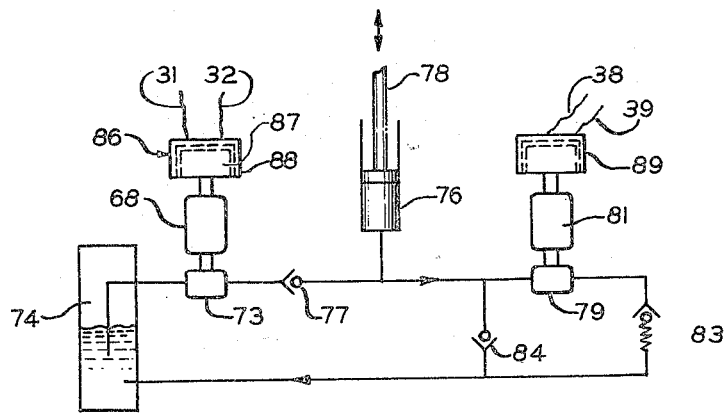
Figure 4 is a modified form of my invention also employing hydraulic coupling means between the driving motors and the electrode.

The device illustrated in Figure 4 is, in general, similar to that shown in Figure 3, except in this instance the alternating current motor 68 is connected directly to the pump 73 and the motor 81 is connected directly to the pump 79. An eddy current brake, generally designated 86, has an armature 87 attached to the shaft of the motor 68 and is surrounded by a field coil 88 connected to the wires 31 and 32. A similar brake 89 is provided for the motor 81, the field of the brake being connected to the wires 38 and 39. In this, as in Figure 3, the effective speed of the motors 68 and 81 is varied according to the degree of energization of the brakes 86 and 89, thereby producing the variation in speed necessary to actuate the output member 76 of the hydraulic differential.

In either of the devices illustrated in Figures 3 or 4, the wires 38 and 39 may be disconnected and a solid coupling substituted for the eddy current clutch 71. The corresponding pump will then be driven at a constant speed and will have an output approximately midway between the maximum and minimum output of the other pump. Variation in the effective speed of the other motor is, of course, controlled by the varying output of the potential transformer 26.

I claim:

1. In an electric arc melting furnace of the type having an upright electrode movable for varying the arcing gap in the arc circuit and conductor means for supplying current to the electrode, the improvement which includes a member coupled to the electrode for raising and lowering the electrode, a first unidirectional electric motor coupled to said member and rotating in a direction raising the electrode, a second unidirectional motor also coupled to said member and rotating in a direction lowering the electrode, hydraulic differential means between the motors and said member driving said member proportionately to the difference in effective speed of the two motors, and electric signaling means coupled to the arc circuit varying the effective speed of one of said motors through a range including the effective speed of the other motor.

2. In an electric arc melting furnace of the type having an upright electrode movable for varying the arcing gap in the arc circuit and conductor means for supplying current to the electrode, the improvement which includes a member coupled to the electrode, hydraulic differential means coupled to the member for driving the electrode upwardly and downwardly, a first unidirectional motor driving the differential means in one direction, a second unidirectional motor driving the differential means in the other direction, said differential means being responsive proportionately to the instantaneous difference in effective speed of the two motors, and electric signaling means coupled to the arc circuit varying the effective speed of one of the motors proportionately to variation in the arc circuit through a range including the effective speed of the other of said motors.

3. In an electric arc melting furnace of the type having an upright electrode movable for varying the arcing gap and conductor means for supplying electric current to the electrode, the improvement which includes telescopic liquid confining means coupled to the electrode for varying the electrode position, hydraulic differential means for driving the confining means, said differential means including a first pump having an outlet communicating with the confining means, a second pump having an inlet communicating with the confining means and liquid supply means for the first pump, a pair of unidirectional alternating current motors, each driving one of the pumps, an eddy current brake coupled to one of the motors, and means for varying the energization of the eddy current brake proportionately to variations in the arc circuit, whereby the discharge volume of one of the pumps is varied through a range including the discharge volume of the other pump.

4. In an electric arc melting furnace of the type having an upright electrode movable for varying the arcing gap and conductor means for supplying electric current to the electrode, the improvement which includes telescopic liquid confining means coupled to the electrode for varying the electrode position, differential means for driving the confining means, said differential means including a first pump having an outlet communicating with the confining means, a second pump having an inlet communicating with the confining means and liquid supply means for the first pump, a pair of unidirectional alternating current motors, each driving one of the pumps, eddy current brakes coupled to said motors, and means for varying the energization of said eddy current brakes proportionately to variations in the arc circuit and oppositely to each other, said last mentioned means including a potential transformer connected between the arc circuit and ground, and a current transformer coupled to the arc circuit.

5. In an electric arc melting furnace of the type having an upright electrode movable for varying the arcing gap and conductor means for supplying electric current to the electrode, the improvement which includes telescopic liquid confining means coupled to the electrode for varying the electrode position, differential means for driving the confining means, said differential means including a first pump having an inlet communicating with the confining means, a second pump having an inlet communicating with the confining means and liquid supply means for the first pump, a pair of unidirectional alternating current motors, each driving one of the pumps, eddy current brakes coupled to said motors, and means for varying the energization of said eddy current brakes proportionately to variations in the arc circuit and oppositely to each other.

6. In an electric arc melting furnace of the type having an upright electrode movable for varying the arcing gap and conductor means for supplying electric current to the electrode, the improvement which includes telescopic liquid confining means coupled to the electrode for varying the electrode position, differential means for driving the confining means, said differential means including a first pump having an outlet communicating with the confining means, a second pump having an inlet communicating with the confining means and liquid supply means for the first pump, a pair of alternating current unidirectional motors, one of the motors being connected to one of the pumps, an eddy current clutch coupling the other of said motors to the other of said pumps, said clutch having a winding, and means for varying the energization of the winding of the eddy current clutch proportionately to variations in the arc circuit, whereby the discharge volume of one of the pumps is varied through a range including the discharge volume of the other pump.

7. In an electric arc melting furnace of the type having an upright electrode movable for varying the arcing gap and conductor means for supplying electric current to the electrode, the improvement which includes telescopic liquid confining means coupled to the electrode for varying the electrode position, differential means for driving the confining means, said differential means including a first pump having an outlet communicating with the confining means, a second pump having an inlet communicating with the confining means and liquid supply means for the first pump, a pair of unidirectional constant speed alternating current motors, eddy current clutches coupling said motors to said pumps, each of said clutches having a winding, and means coupled to the arc circuit for energizing said clutches proportionately to variation in the arcing circuit and oppositely to each other.

8. In an electric arc melting furnace of the type having an upright electrode movable for varying the arcing gap and conductor means for supplying electric current to the electrode, the improvement which includes telescopic liquid confining means coupled to the electrode for varying the electrode position, differential means for driving the confining means, said differential means including a first pump having an outlet communicating with the confining means, a second pump having an inlet communicating with the confining means and liquid supply means for the first pump, a pair of unidirectional constant speed alternating current motors, eddy current clutches coupling said motors to said pumps, each of said clutches having a winding, means coupled to the arc circuit for energizing said clutches and oppositely to each other, said means including a potential transformer connected between the arc circuit and ground and a current transformer coupled to the arc circuit.

References Cited in the file of this patent

UNITED STATES PATENTS

| | | |
|---|---|---|
| 2,183,473 | Burgett | Dec. 12, 1939 |
| 2,468,570 | Nyburg | Apr. 26, 1949 |
| 2,518,580 | Trofimov | Aug. 15, 1950 |
| 2,653,269 | Vocak et al. | Sept. 22, 1953 |
| 2,671,181 | Morey | Mar. 2, 1954 |